United States Patent
Hu et al.

(10) Patent No.: US 11,710,215 B2
(45) Date of Patent: Jul. 25, 2023

(54) FACE SUPER-RESOLUTION REALIZATION METHOD AND APPARATUS, ELECTRONIC DEVICE AND STORAGE MEDIUM

(71) Applicant: Beijing Baidu Netcom Science and Technology Co., Ltd., Beijing (CN)

(72) Inventors: Tianshu Hu, Beijing (CN); Jiaming Liu, Beijing (CN); Zhibin Hong, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 173 days.

(21) Appl. No.: 17/208,651

(22) Filed: Mar. 22, 2021

(65) Prior Publication Data

US 2021/0209732 A1 Jul. 8, 2021

(30) Foreign Application Priority Data

Jun. 17, 2020 (CN) .......................... 202010552759.6

(51) Int. Cl.
*G06T 3/40* (2006.01)
*G06T 7/174* (2017.01)
(Continued)

(52) U.S. Cl.
CPC ............. *G06T 3/4046* (2013.01); *G06N 3/08* (2013.01); *G06T 3/4053* (2013.01); *G06T 7/174* (2017.01);
(Continued)

(58) Field of Classification Search
None
See application file for complete search history.

(56) References Cited

U.S. PATENT DOCUMENTS

2015/0235087 A1 8/2015 Bigioi et al.
2016/0371537 A1 12/2016 He
(Continued)

FOREIGN PATENT DOCUMENTS

CN 106022269 A * 10/2016 ......... G06K 9/00221
CN 107742112 A * 2/2018
(Continued)

OTHER PUBLICATIONS

Yang et al., "Nuclear Norm based Matrix Regression with Applications to Face Recognition with Occlusion and Illumination Changes", School of Computer Science and Engineering, Nanjing University of Science and Technology, Nanjing 210094, P R. China.
(Continued)

Primary Examiner — Jiangeng Sun
(74) Attorney, Agent, or Firm — Banner & Witcoff, Ltd.

(57) ABSTRACT

The present application discloses a face super-resolution realization method and apparatus, an electronic device and a storage medium, and relate to fields of face image processing and deep learning. The specific implementation solution is as follows: a face part in a first image is extracted; the face part is input into a pre-trained face super-resolution model to obtain a super-sharp face image; a semantic segmentation image corresponding to the super-sharp face image is acquired; and the face part in the first image is replaced with the super-sharp face image, by utilizing the semantic segmentation image, to obtain a face super-resolution image.

11 Claims, 9 Drawing Sheets

(51) Int. Cl.
*G06N 3/08* (2023.01)
*G06V 40/16* (2022.01)
*G06V 10/26* (2022.01)

(52) U.S. Cl.
CPC ............ *G06V 10/26* (2022.01); *G06V 40/165* (2022.01); *G06V 40/171* (2022.01); *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 2017/0256033 A1* | 9/2017 | Tuzel | ............... G06T 3/4053 |
| 2019/0370660 A1 | 12/2019 | Wong et al. | |

FOREIGN PATENT DOCUMENTS

| | | | | |
|---|---|---|---|---|
| CN | 108304816 | A | | 7/2018 |
| CN | 108391111 | A | | 8/2018 |
| CN | 108460343 | A | | 8/2018 |
| CN | 109191392 | A | * | 1/2019 ............... G06T 5/00 |
| CN | 109584162 | A | | 4/2019 |
| CN | 109712144 | A | | 5/2019 |
| CN | 109740688 | A | * | 5/2019 |
| CN | 109741338 | A | | 5/2019 |
| CN | 109785311 | A | | 5/2019 |
| CN | 109815928 | A | | 5/2019 |
| CN | 109948441 | A | | 6/2019 |
| CN | 109978754 | A | | 7/2019 |
| CN | 110008817 | A | | 7/2019 |
| CN | 110263756 | A | * | 9/2019 |
| CN | 110309706 | A | | 10/2019 |
| CN | 110414463 | A | * | 11/2019 |
| CN | 110443230 | A | | 11/2019 |
| CN | 111047509 | A | | 4/2020 |
| CN | 111126265 | A | | 5/2020 |
| CN | 111163265 | A | | 5/2020 |
| CN | 111275784 | A | | 6/2020 |
| JP | 2012042988 | A | | 3/2012 |
| JP | 2019501454 | A | | 1/2019 |
| KR | 101382892 | B1 | | 4/2014 |
| WO | WO-2020062191 | A1 | * | 4/2020 |
| WO | WO-2020233129 | A1 | * | 11/2020 ........... G06T 11/001 |

OTHER PUBLICATIONS

Buhler Marcel Christoph et al: "DeepSEE: Deep Disentangled Semantic Explorative Extreme Super-Resolution" IN: "ArXiv", Apr. 9, 2020 (Apr. 9, 2020), XP55836662, pp. 1-46.

Jiang J et al: "Noise Robust Face Image Super-Resolution Through Smooth Sparse Representation", IEEE Transactions on Cybernetics, vol. 47, No. 11, Nov. 1, 2017 (Nov. 1, 2017), pp. 3991-4002, XP55836638, Piscataway, NJ, USA.

Chen Yu et al: "FSRNet: End-to-End Learning Face Super-Resolution with Facial Priors", IEEE/CVF Conference on Computer Vision and Pattern Recognition, Jun. 1, 2018 (Jun. 1, 2018), pp. 2492-2501, XP55836671.

D Kim et al: "Progressive Face Super-Resolution via Attention to Facial Landmark", arxiv.org, Cornell University Library, Ithaca, NY, Aug. 22, 2019 (Aug. 22, 2019), pp. 1-12, XP081467541.

Y Xin et al: "Face Super-Resolution Guided by Facial Component Heatmaps", Oct. 5, 2018 (Oct. 5, 2018), Advances in Databasesand Information Systems; Lecture Notes in Computer Science Springer, Cham, XP047496847, pp. 1-17.

Buhler M C et al.: "DeepSEE: Deep Disentangled Semantic Explorative Extreme Super-Resolution", In "arXiv:2004.04433v1 [cs.CV]", Apr. 9, 2020, XP55836662, pp. 1-46.

Jiang J et al: "Noise Robust Face Image Super-Resolution Through Smooth Sparse Representation", IEEE Transactions on Cybernetics, vol. 47, No. 11, Nov. 1, 2017, pp. 3991-4002, XP55836638.

Chen Yu et al: "FSRNet: End-to-End Learning Face Super-Resolution with Facial Priors", IEEE/CVF Conference on Computer Vision and Pattern Recognition, Jun. 1, 2018, pp. 2492-2501, XP55836671.

D Kim et al: "Progressive Face Super-Resolution via Attention to Facial Landmark", Arxiv.Org, Cornell University Library, Ithaca, NY, Aug. 22, 2019, pp. 1-12, XP081467541.

Y Xin et al: "Face Super-Resolution Guided by Facial Component Heatmaps", Oct. 5, 2018, Advances in Databases and Information Systems; Lecture Notes in Computer Science; Springer, Cham, XP047496847, pp. 1-17.

Jan. 13, 2023—(CN) Office Action—App. No. 202010552759.6.

Jan. 9, 2023—(CN) First Search Report—App. No. 202010552759.6.

Shi Zhenwei et al., "Review of Image Super-Resolution Reconstruction," Journal of Data Acquisition and Processing, vol. 35, No. 1, Jan. 2020, pp. 1-20.

Lu, Tao et al., "Face Super-Resoution via Nonlinear Adaptive Representation," Neural Computing Applications published Dec. 19, 2019.

* cited by examiner

FACE SUPER-RESOLUTION REALIZATION METHOD AND APPARATUS, ELECTRONIC DEVICE AND STORAGE MEDIUM

CROSS-REFERENCE TO RELATED APPLICATION

This application claims priority to Chinese patent application No. 202010552759.6, filed on Jun. 17, 2020, which is hereby incorporated by reference in its entirety.

TECHNICAL FIELD

The present application relates to fields of image processing and deep learning, and particularly to a field of face image processing.

BACKGROUND

In an existing image enhancement application, there are generally two methods for image enhancement processing. The first method is that, an original image is up-sampled by means of a traditional interpolation method, to obtain an image having an enlarged size. Although the size of the image obtained by this method is enlarged, the definition of the image cannot be guaranteed. By the second method, some of the existing solutions can improve the definition of the image. However, these existing solutions are all for general-purpose images, and there is no super-resolution realization solution for a category regarding face. Therefore, the effect of such solutions is generally not prominent when a particular category of images needs to be processed.

SUMMARY

The present application provides a face super-resolution realization method and apparatus, an electronic device, and a storage medium.

According to an aspect of the present application, provided is a face super-resolution realization method, including:

extracting a face part in a first image;

inputting the face part into a pre-trained face super-resolution model to obtain a super-sharp face image;

acquiring a semantic segmentation image corresponding to the super-sharp face image; and replacing the face part in the first image with the super-sharp face image, by utilizing the semantic segmentation image, to obtain a face super-resolution image.

According to another aspect of the present application, provided is a face super-resolution realization apparatus, including:

an extraction module configured to extract a face part in a first image;

a super-sharp processing module configured to input the face part into a pre-trained face super-resolution model to obtain a super-sharp face image;

a semantic segmentation image acquisition module configured to acquire a semantic segmentation image corresponding to the super-sharp face image; and a fusion module configured to replace the face part in the first image with the super-sharp face image, by utilizing the semantic segmentation image, to obtain a face super-resolution image.

According to another aspect of the present application, provided is an electronic device, including:

at least one processor; and a memory communicatively connected to the at least one processor, wherein, the memory stores instructions executable by the at least one processor, and the instructions are executed by the at least one processor to enable the at least one processor to execute the method described above.

According to another aspect of the present application, provided is a non-transitory computer-readable storage medium storing a computer instruction thereon, the computer instructions causing a computer to execute the method described above.

It should be understood that the description in this section is not intended to identify key or critical features of the embodiments of the present application, nor is it intended to limit the scope of the application. Other features of the present application will become readily apparent from the following description.

BRIEF DESCRIPTION OF THE DRAWINGS

The drawings are used to better understand the solutions and do not constitute a limitation to the present application.

DETAILED DESCRIPTION

Exemplary embodiments of the present application are described below with reference to the accompanying drawings, including various details of the embodiments of the present application to facilitate the understanding, and those embodiments should be considered as merely exemplary. Thus, it should be understood by those having ordinary skill in the art that various changes and modifications can be made to the embodiments described herein without departing from the scope and spirit of the present application. Also, for the sake of clarity and conciseness, the contents of well-known functions and structures are omitted in the following description.

As can be seen from the above, an existing face super-resolution technology has the following defects. Firstly, the definition of the processed image is not enough; and secondly, there is no super-resolution realization method specifically for face images.

Figure 1:
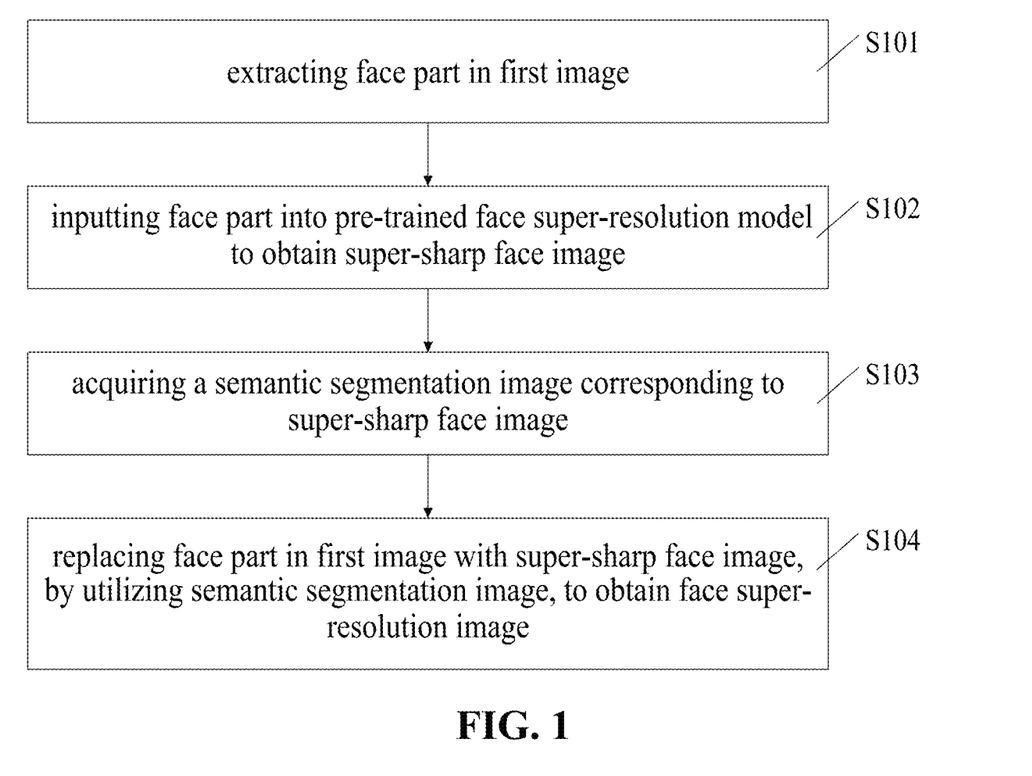
FIG. 1 is a flow chart I of a face super-resolution realization method according to an embodiment of the present application.

The embodiments of the present application provide a face super-resolution realization method. FIG. 1 is a flow chart I of a face super-resolution realization method according to an embodiment of the present application, and the method may include:

S101, extracting a face part in a first image;

S102, inputting the face part into a pre-trained face super-resolution model to obtain a super-sharp face image.

S103, acquiring a semantic segmentation image corresponding to the super-sharp face image;

S104, replacing the face part in the first image with the super-sharp face image, by utilizing the semantic segmentation image, to obtain a face super-resolution image.

According to the embodiments of the present application, a face part can be extracted from an image containing the face part, and a resolution of the face part is improved and also a super-sharp face image is obtained; and the super-sharp face image is aligned back to a position of the face part in the image, so as to replace the face part in the image with the super-sharp face image, thereby improving a resolution of a face image.

The face super-resolution model is able to improve a resolution of a face image. According to the embodiments of the present application, the face part in the first image is extracted, so as to improve the resolution of the extracted face part and obtain the super-sharp face image; then the super-sharp face image is placed back to a position where the face part is located in the first image, to replace the face part in the first image, so that the resolution of the face part in the first image is improved.

Figure 2:
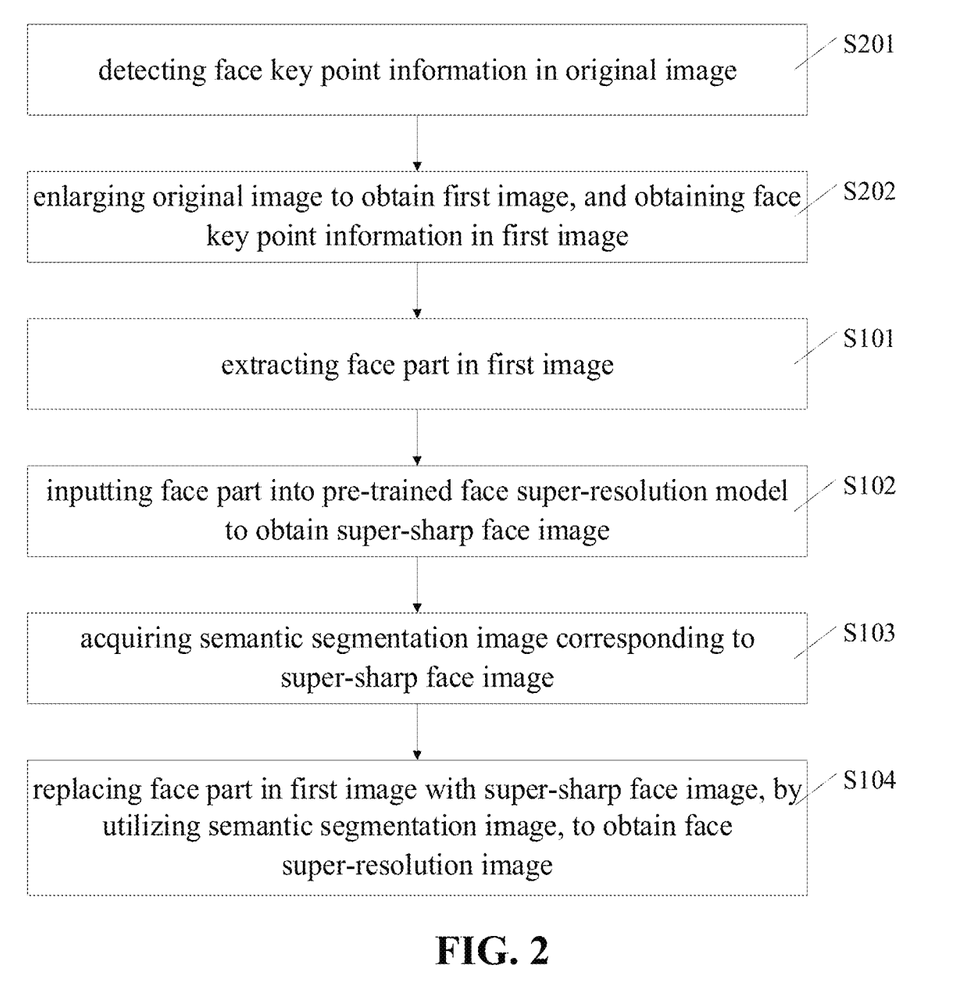
FIG. 2 is a flow chart II of a face super-resolution realization method according to an embodiment of the present application.

FIG. 2 is a flow chart II of a face super-resolution realization method according to an embodiment of the present application. As shown in FIG. 2, before the above-mentioned S101, the method in this embodiment of the present application may further include:

S201, detecting face key point information in an original image;

S202, enlarging the original image to obtain the first image, and obtain face key point information in the first image; wherein the face key point information in the first image includes information obtained by performing image enlargement processing on the face key point information in the original image.

In some embodiments, S201 as described above may include:

inputting the original image into a pre-trained face key point detection model to obtain a face key point position output by the face key point detection model.

The face key point detection model can be used to determine the face key point position in the original image accurately.

In some embodiments, S202 as described above may include:

performing an interpolation operation on the original image according to a user-selected magnification ratio (e.g., the selectable magnification ratios may include 1, 2, 4, etc.) to enlarge the original image to a corresponding size.

Optionally, according to the embodiments of the present application, a bilinear interpolation operation may be utilized. While the original image is enlarged into the first image, the face key point information in the original image is enlarged by a corresponding size to obtain the face key point information in the first image.

Figure 3:
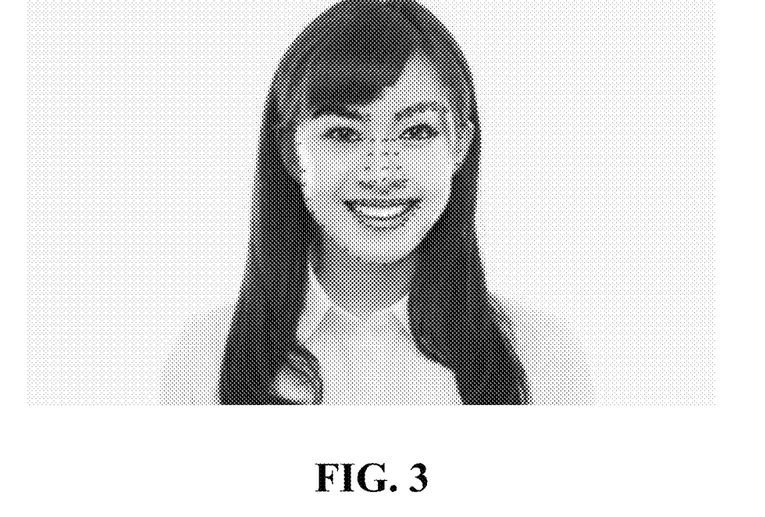
FIG. 3 is a schematic diagram of an original image according to an embodiment of the present application.
Figure 4:
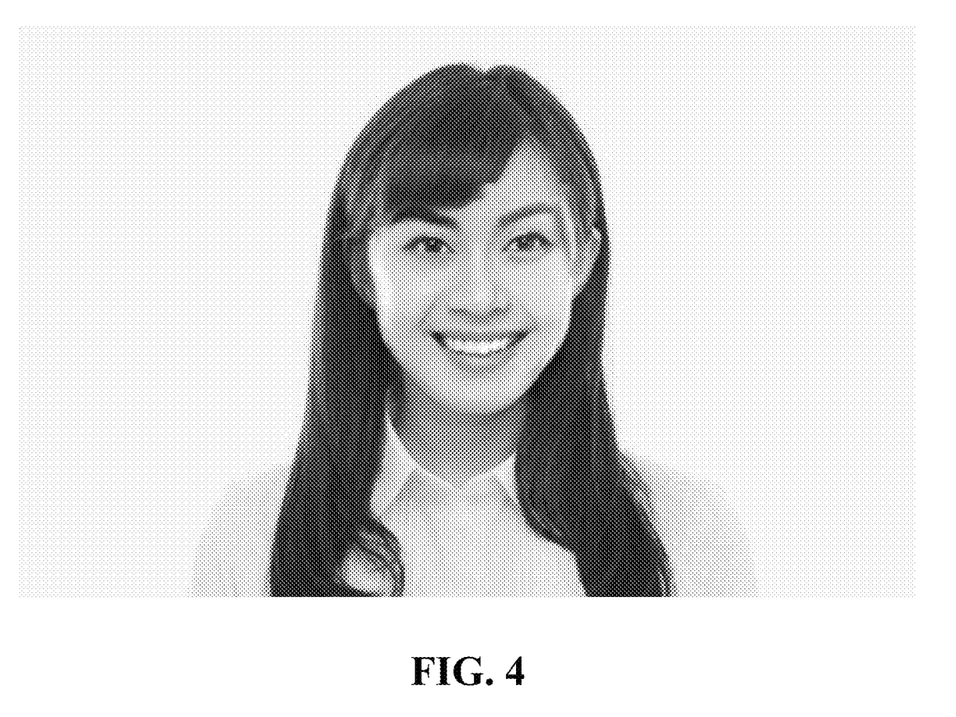
FIG. 4 is a schematic diagram of a first image according to an embodiment of the present application.

FIG. 3 is a schematic diagram of an original image according to an embodiment of the present application. The image is a synthetic face image, and points on a face in FIG. 3 are key points of the face. FIG. 4 is a schematic diagram of a first image according to an embodiment of the present application. FIG. 4 is an image obtained by enlarging FIG. 3 by 2 times. The embodiments of the present application not only can carry out super-resolution processing on the synthetic face image, but also can carry out super-resolution processing on a face image of a real person.

According to the embodiments of the present application, the original image is enlarged according to the user-selected magnification to obtain the first image, and the resolution of the face part in the first image is improved; and thus, it is possible to control the enlarged size of the image, and to guarantee sufficient definition while the size is enlarged.

In some embodiments, S101 as described above may include:

calculating a conversion matrix for realizing face alignment by utilizing the face key point information in the first image above; and extracting the face part in the first image by utilizing the conversion matrix.

Specifically, the face key point information in the first image is used as a point cloud to calculate the conversion matrix for realizing face alignment, and then the face part is cutout from the first image through the conversion matrix and becomes an image having a size of (N*N) through affine transformation, wherein N being a positive integer. This step is primarily to extract the face part from the first image and scale it to a size suitable for processing by the face super-resolution model.

In some embodiments, the above image size N may be calculated according to a size of the face, e.g., a larger face corresponds to a larger N. In some embodiments, taking into account the final processing effect and the speed of model prediction, a value range of N is set to be 128 to 256, according to the embodiments of the present application.

Figure 5:
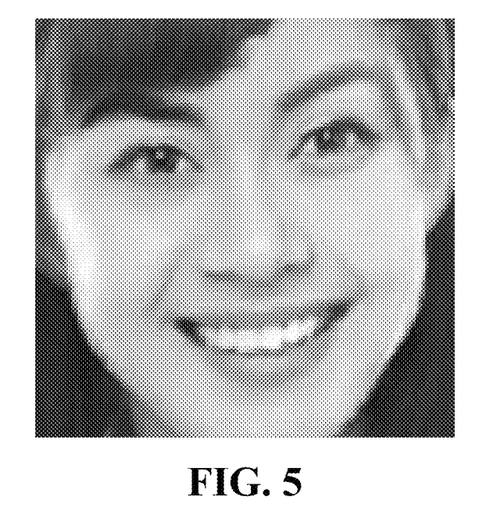
FIG. 5 is a schematic diagram of a face part image according to an embodiment of the present application.

FIG. 5 is a schematic diagram of a face part image according to an embodiment of the present application. FIG. 5 shows the face part extracted from the first image shown in FIG. 4. In the example of FIG. 5, the face part image has a size of 128*128, i.e., N=128.

In some embodiments, the face super-resolution model described above adopts a generative adversarial network (GAN). The GAN model can improve the resolution of an image, and particularly has a better effect in improving the resolution of a face image. The present application does not limit the type of the model adopted by the face super-resolution model.

Figure 6:
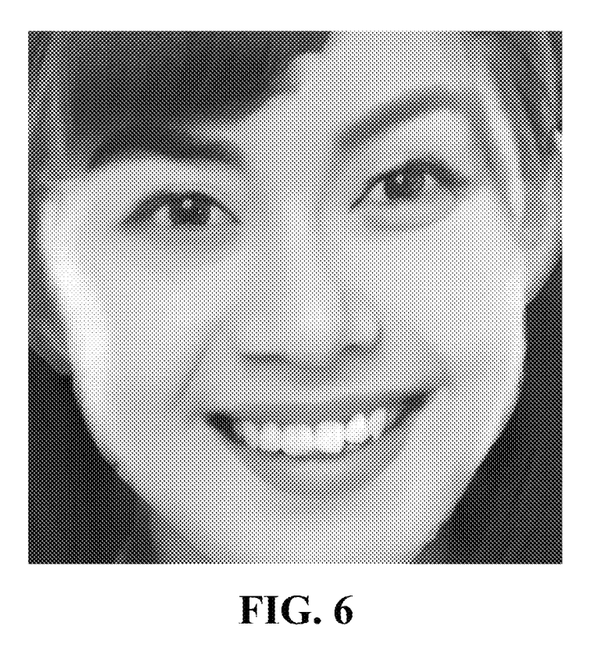
FIG. 6 is a schematic diagram of a super-sharp face according to an embodiment of the present application.

In some embodiments, in S102 above, the face part image having the size of N*N is input to the pre-trained face super-resolution model to obtain a 4N*4N super-sharp face image. FIG. 6 is a schematic diagram of a super-sharp face image according to an embodiment of the present application, in which the size of the super-sharp face image is four times that of the input face part image. Under the condition that content of the face part image is not changed (i.e., illumination, texture, posture, expression and the like are not changed), the definition of the entire image of the output super-sharp face image is improved. At the same time, part of noise of the input face part image may be removed, so as to enable the obtained super-sharp face image to be clearer and cleaner. Since the face super-resolution model used in the embodiments of the present application is trained for face images, a better processing effect of improving the resolution can be achieved for the face images.

In some embodiments, S103 as described above may include:

inputting the super-sharp face image into a pre-trained face segmentation model to obtain a segmented image; and determining a semantic segmentation image corresponding to the super-sharp face image by utilizing the segmented image.

Figure 7:
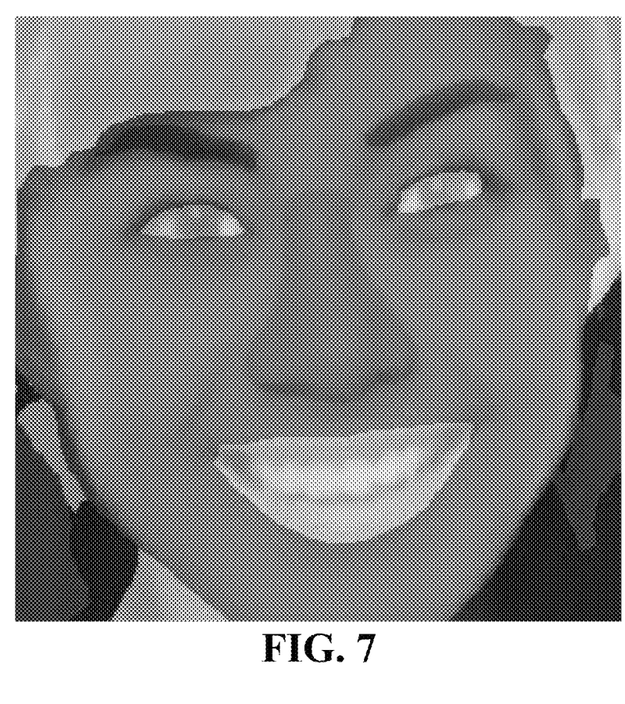
FIG. 7 is a schematic diagram of a segmented image output by a face segmentation model according to an embodiment of the present application.

FIG. 7 is a schematic diagram of a segmented image output by a face segmentation model according to an embodiment of the present application. As shown in FIG. 7, five sense organs and other positions on the face may be marked in the segmented image.

Figure 8:
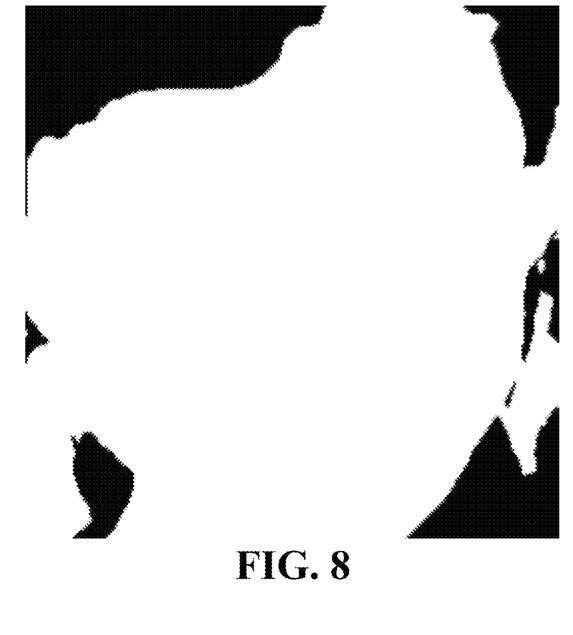
FIG. 8 is a schematic diagram of a semantic segmentation image according to an embodiment of the present application.

FIG. 8 is a schematic diagram of a semantic segmentation image according to an embodiment of the present application. As shown in FIG. 8, the face part can be accurately determined as a foreground and separated from the entire image, by the semantic segmentation image.

In some embodiments, S103 as described above may include:

placing the super-sharp face image described above at a first position by utilizing an inverse matrix of the conversion matrix, the first position being a position of the face part in the first image described above; and taking the semantic segmentation image as a mask image, and fusing the super-sharp face image placed at the first position with the first image by utilizing the mask image, to replace the face part in the first image.

Figure 9:
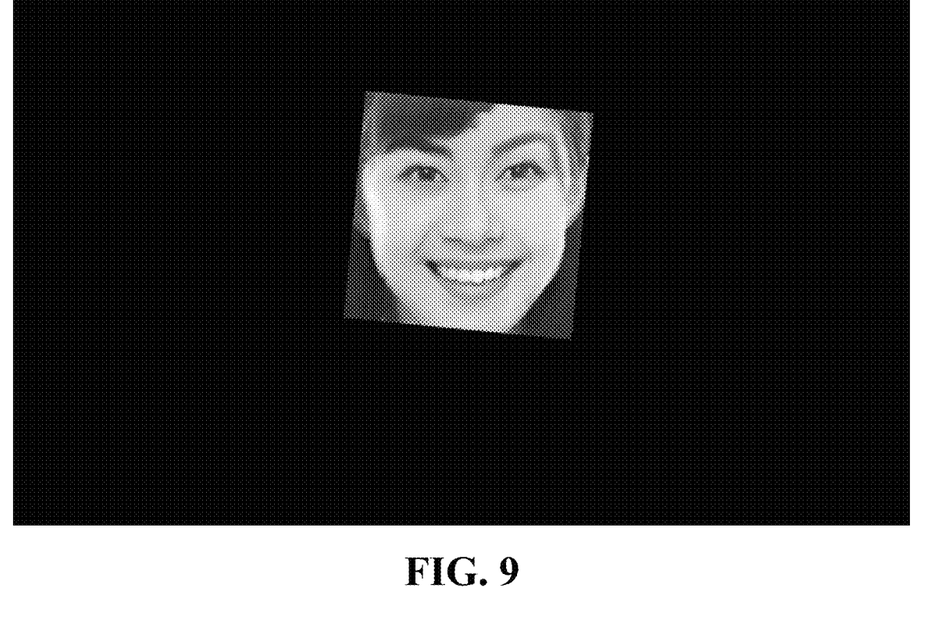
FIG. 9 is a schematic diagram of a super-sharp face image aligned back to a position in an original image according to an embodiment of the present application.

In some embodiments, the super-sharp face image may be aligned back to a position in the original image and scaled to a size identical to the size of the face in the original image, by using the inverse matrix of the conversion matrix. FIG. 9 is a schematic diagram of a super-sharp face image aligned back to a position in an original image position according to an embodiment of the present application.

Figure 10:
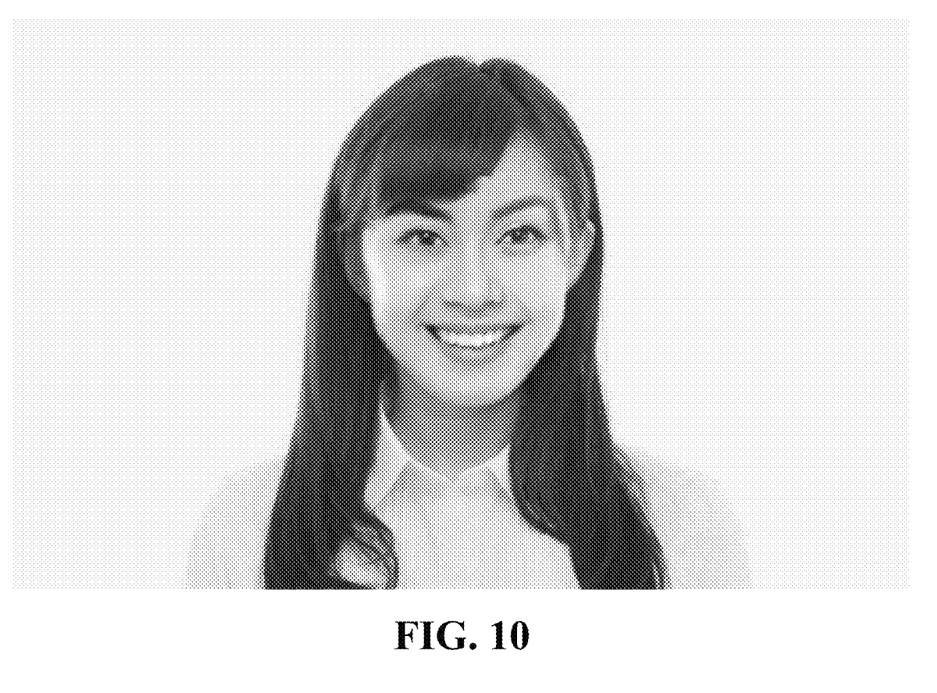
FIG. 10 is a schematic diagram of a face super-resolution realization result according to an embodiment of the present application.

According to the embodiments of the present application, by using a face fusion algorithm and using the semantic segmentation image as the mask image, the super-sharp face image is fused onto an original image (i.e., the above-mentioned first image), and a low-sharp face in the original image is replaced with the super-sharp face image, thereby obtaining a final result of realizing the super-resolution of the face. FIG. 10 is a schematic diagram of a face super-resolution realization result according to an embodiment of the present application.

In summary, according to a GAN-based face super-resolution method provided by the embodiments of the present application, under the condition that a size of an image is enlarged, the resolution and definition of a face in the image can be improved. The method provided by the embodiments of the present application can be implemented with low delay on a computer, has very wide application in fields of face recognition and detection, live video, movie and television special effects and the like, and has a good user experience.

Figure 11:
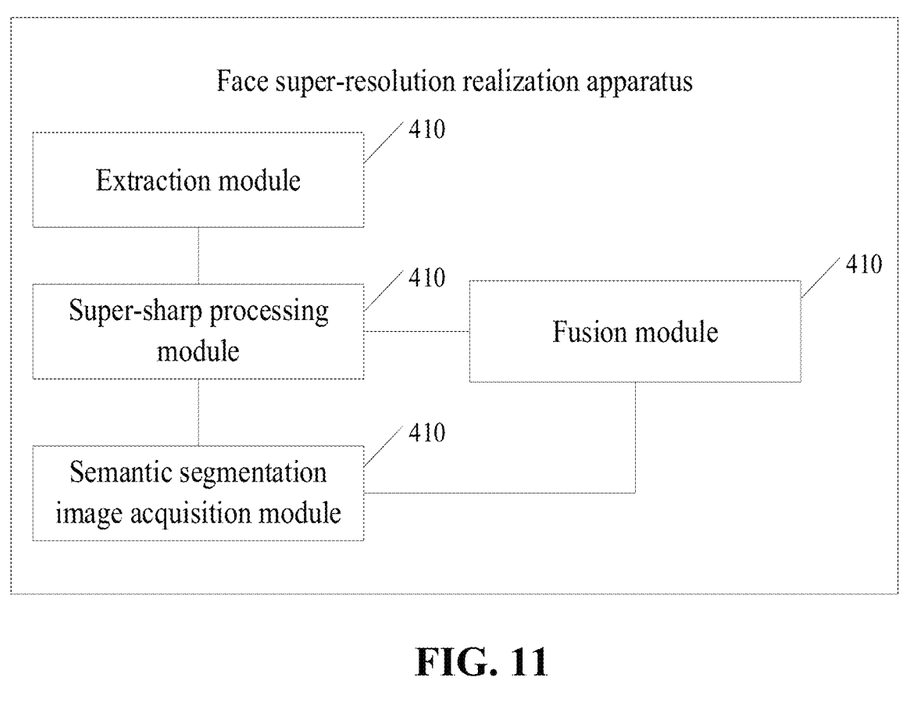
FIG. 11 is a schematic structural diagram I of a face super-resolution realization apparatus according to an embodiment of the present application.

The embodiments of the present application further provide a face super-resolution realization apparatus, and FIG. 11 is a schematic structural diagram I of a face super-resolution realization apparatus according to an embodiment of the present application. The apparatus may include:

an extraction module 410 configured to extract a face part in a first image;

a super-sharp processing module 420 configured to input the face part into a pre-trained face super-resolution model to obtain a super-sharp face image;

a semantic segmentation image acquisition module 430 configured to acquire a semantic segmentation image corresponding to the super-sharp face image; and a fusion module 440 configured to replace the face part in the first image with the super-sharp face image, by utilizing the semantic segmentation image, to obtain a face super-resolution image.

Figure 12:
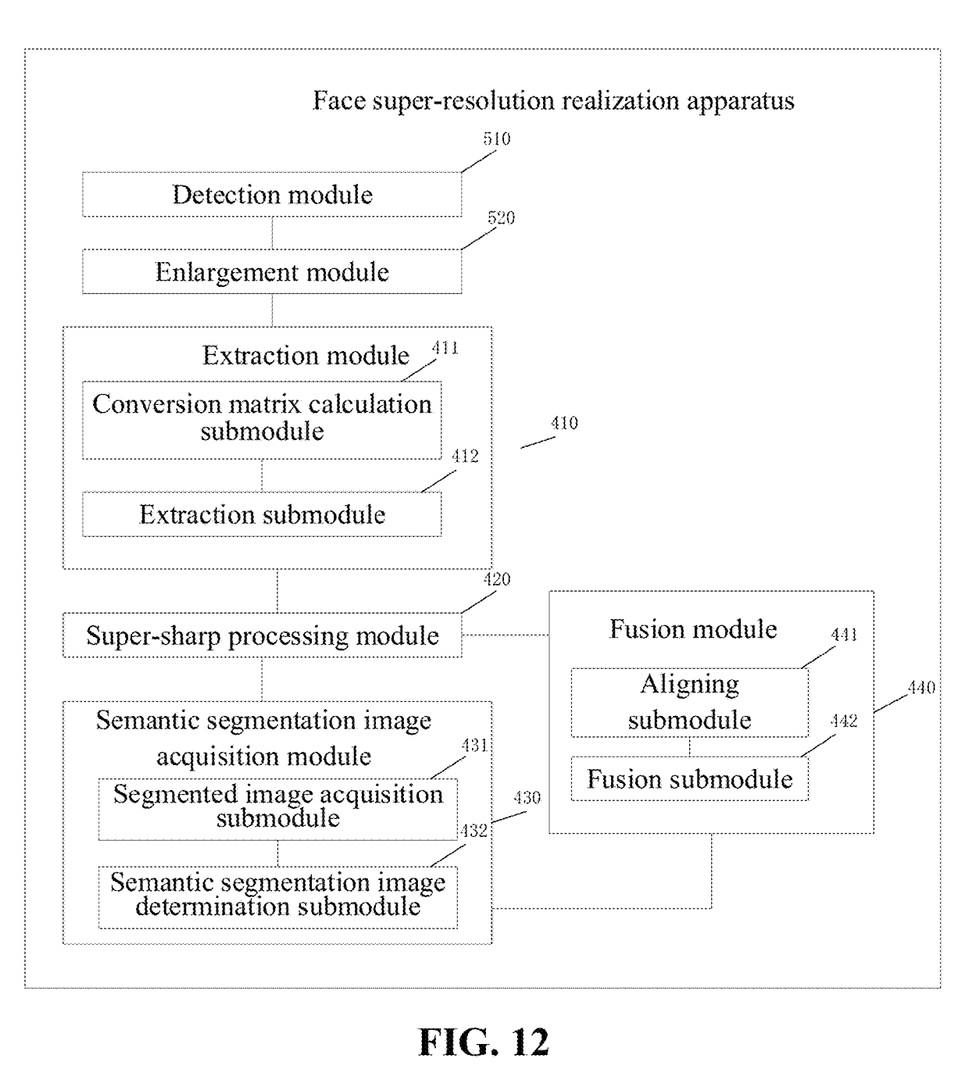
FIG. 12 is a schematic structural diagram II of a face super-resolution realization apparatus according to an embodiment of the present application.

In some embodiments, as shown in FIG. 12, the face super-resolution realization apparatus provided by the embodiments of the present application may further include:

a detection module 510 configured to detect face key point information in an original image; and an enlargement module 520 configured to enlarge the original image to obtain the first image, and obtain face key point information in the first image. Wherein, the face key point information in the first image may include information obtained by image enlarging the face key point information in the original image.

In some embodiments, the above detection module 510 is configured to input the original image into a pre-trained face key point detection model to obtain the face key point information in the original image.

In some embodiments, the above extraction module 410 may include:

a conversion matrix calculation submodule 411 configured to calculate a conversion matrix for realizing face alignment by utilizing the face key point information in the first image; and an extraction submodule 412 configured to extract the face part in the first image by utilizing the conversion matrix.

In some embodiments, the face super-resolution model described above is a GAN model.

In some embodiments, the above semantic segmentation image acquisition module 430 may include:

a segmented image acquisition submodule 431 configured to input the super-sharp face image into a pre-trained face segmentation model to obtain a segmented image; and a semantic segmentation image determination submodule 432 configured to determine the semantic segmentation image corresponding to the super-sharp face image by utilizing the segmented image.

In some embodiments, the fusion module 440 described above may include:

an alignment submodule 441 configured to place the super-sharp face image at a first position by utilizing an inverse matrix of the conversion matrix, the first position being a position of the face part in the first image; and a fusion submodule 442 configured to take the semantic segmentation image as a mask image, and fuse the super-sharp face image placed at the first position with the first image by utilizing the mask image, to replace the face part in the first image.

The function of each module in each apparatus in the embodiments of the present application can be described by referring to the corresponding description in the above-mentioned method, and will not be described in detail herein.

According to the embodiments of the present application, an electronic device and a readable storage medium are further provided by the present application.

Figure 13:
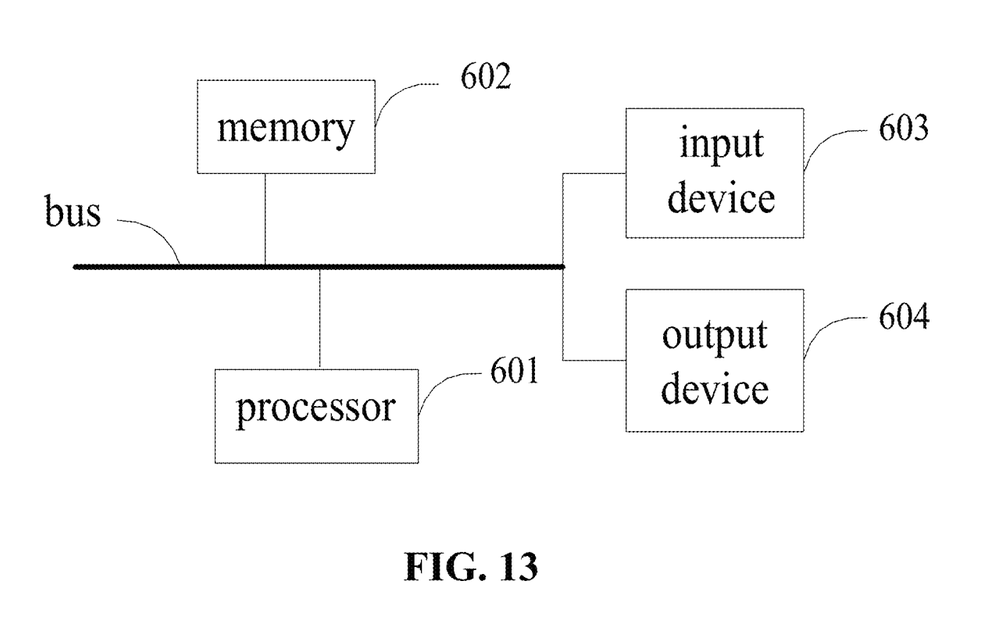
FIG. 13 is a block diagram of an electronic device used for implementing a face super-resolution realization method according to an embodiment of the present application.

FIG. 13 is a block diagram of an electronic device used for implementing a face super-resolution realization method according to an embodiment of the present application. The electronic device is intended to represent various forms of digital computers, such as laptop computers, desktop computers, work table, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, connections and relationships thereof, and functions thereof are by way of example only and are not intended to limit the implementations of the present application described and/or claimed herein.

As shown in FIG. 13, the electronic device includes: one or more processors 601, a memory 602, and interfaces for connecting various components. including a high-speed interface and a low-speed interface. The various components are connected to each other by different buses, and may be mounted on a common mainboard or mounted in other ways as required. The processor may process an instruction executed in the electronic device, including an instruction stored in or on the memory to display Graphical User Interface (GUI) graphical information on an external input/output apparatus (e.g., a display device coupled to an interface). In other embodiments, if necessary, a plurality of processors and/or a plurality of buses may be used together with a plurality of memories. Similarly, a plurality of electronic devices may be connected, each device provides some of the necessary operations (e.g., used as a server array, a group of blade servers, or a multi-processor system). In FIG. 13, one processor 601 is taken as an example.

The memory 602 is a non-transitory computer-readable storage medium provided by the present application. The memory stores an instruction executable by at least one processor to cause the at least one processor to perform the face super-resolution realization method provided by the present application. The non-transitory computer-readable storage medium of the present application stores a computer instruction for causing a computer to perform the face super-resolution realization method provided by the present application.

As a non-transitory computer-readable storage medium, the memory 602 may be configured to store a non-transitory software program, a non-transitory computer-executable program and module, such as a program instruction/module corresponding to the face super-resolution realization method in embodiments of the present application (e.g., the extraction module 410, the super-sharp processing module 420, the semantic segmentation image acquisition module 430 and the fusion module 440 as shown in FIG. 11). The processor 601 executes various functional applications and data processing of the electronic device by running the non-transient software program, instruction and module stored in the memory 602, thereby realizing the face super-resolution realization method in the method embodiments described above.

The memory 602 may include a program storage area and a data storage area. The program storage area may store an operating system, an application program required for at least one function. The data storage area may store data created according to the use of the electronic device for realizing the face super-resolution, etc. In addition, the memory 602 may include a high-speed random-access memory, and may also include a non-transitory memory, such as at least one magnetic disk storage device, a flash memory device, or any other non-transitory solid memory device. In some embodiments, the memory 602 may optionally include a memory remotely located relative to the processor 601, and the remote memory may be connected to the electronic device for realizing the face super-resolution through a network. Examples of the network include, but are not limited to, the Internet, an intranet, a local area network, a mobile communication network, and combinations thereof.

The electronic device for implementing the face super-resolution realization method may further include: an input device 603 and an output device 604. The processor 601, the memory 602, the input device 603, and the output device 604 may be connected by buses or in other ways, and the bus connection is taken as an example in FIG. 13.

The input device 603 may receive input digital or character information, and generate a key signal input related to a user setting and a functional control of the electronic device for realizing the face super-resolution. The input device 603 for example may be a touch screen, a keypad, a mouse, a track pad, a touch pad, an indicator stick, one or more mouse buttons, a trackball, a joystick, etc. The output device 604 may include a display device, an auxiliary lighting device (e.g., an LED), a touch feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the system and technology described herein may be implemented in a digital electronic circuit system, an integrated circuit system, an Application Specific Integrated Circuit (ASIC), computer hardware, firmware, software, and/or combinations thereof. These various embodiments may be implemented in one or more computer programs executable and/or interpretable on a programmable system including at least one programmable processor, and the programmable processor may be a dedicated or general-purpose programmable processor and capable of receiving and transmitting data and instructions from and to a storage system, at least one input device, and at least one output device.

The computing program (also called as program, software, software application, or code) include a machine instruction of a programmable processor, and may be implemented by utilizing a high-level procedural and/or object-oriented programming language, and/or an assembly/machine language. As used herein, the terms "machine-readable medium" and "computer-readable medium" refer to any computer program product, device, and/or device (e.g., a magnetic disk, an optical disk, a memory and a programmable logic device (PLD)) for providing the machine instruction and/or data to the programmable processor, including a machine-readable medium that receives a machine instruction as a machine-readable signal. The term "machine-readable signal" refers to any signal used to provide the machine instruction and/or data to the programmable processor.

In order to provide an interaction with a user, the system and the technology described herein may be implemented on a computer having a display device (e.g., a CRT (cathode ray tube) or an LCD (liquid crystal display) monitor) for displaying information to a user, and a keyboard and a pointing device (e.g., a mouse or a trackball), through which the user can provide an input to the computer. Other types of devices may also be used to provide an interaction with the user; For example, a feedback provided to the user may be any form of sensory feedback (e.g., a visual feedback, an auditory feedback, or a touch feedback); and an input from the user may be received in any form, including an acoustic input, a voice input, or a touch input.

The system and technology described herein may be embodied in a computing system that includes a background component (e.g., used as a data server), or a computing system that includes a middleware component (e.g., an application server), or a computing system that includes a front-end component (e.g., a user computer having a graphical user interface or a web browser, through which the user can interact with the embodiments of the system and technology described herein), or a computing system that includes any combination of such background component, middleware component, or front-end component. The components of the system may be connected to each other through a digital data communication in any form or medium (e.g., a communication network). Examples of the communication network includes a local area network (LAN), a wide area network (WAN), and the Internet.

The computer system may include a client and a server. The client and server are generally remote from each other and usually interact through a communication network. The relationship between the client and the server is generated by computer programs running on corresponding computers and having a client-server relationship with each other. The server may be a cloud server (also called as cloud computing server or cloud host), which is a host product in a cloud computing service system, and aims at solving the defects of high management difficulty and weak business expansibility in the traditional physical host and VPS service.

According to the technical solutions provided by the embodiments of the present application, key point information of a face in an original image can be detected by using a key point detection model; and the original image is enlarged according to a user-selected magnification to obtain a first image, and the key point information of the face in the original image is enlarged by a corresponding size. A conversion matrix for realizing face alignment is calculated according to key points of the face, and a face part is cutout from the first image by utilizing the conversion matrix and becomes a fixed-size image through affine transformation. The image is input into a pre-trained GAN model to obtain a super-sharp face image after improving the resolution; and then the super-sharp face image is fused into the first image by utilizing an inverse matrix of the conversion matrix and a semantic segmentation image of the corresponding face part, and a low-sharp face in the first image is replaced with the super-sharp face image to obtain a final result image, thereby realizing the enlargement of the original image and improving the resolution of the face part.

It should be understood that the steps may be reordered, added or deleted using various forms of flows as illustrated above. For example, the steps described in the present application may be performed in parallel, sequentially or in a different order, so long as the desired result of the technical solution disclosed in the present application can be achieved, which is not limited herein.

The above-described embodiments do not limit the protection scope of the present application. It should be understood by those having ordinary skill in the art that various modifications, combinations, sub-combinations and replacements can be made according to design requirements and other factors. Any modification, equivalent replacement and improvement made under the spirit and principle of the present application should fall within the protection scope of the present application.

What is claimed is:

1. A face super-resolution realization method, comprising:
   extracting a face part in a first image;
   inputting the face part into a pre-trained face super-resolution model to obtain a super-sharp face image;
   acquiring a semantic segmentation image corresponding to the super-sharp face image; and
   replacing the face part in the first image with the super-sharp face image, by utilizing the semantic segmentation image, to obtain a face super-resolution image;
   wherein the method further comprises:
   detecting face key point information in an original image; and
   enlarging the original image to obtain the first image, and obtaining face key point information in the first image, wherein the face key point information in the first image comprises information obtained by performing image enlargement processing on the face key point information in the original image;
   wherein extracting the face part in the first image comprises: calculating a conversion matrix for realizing face alignment by utilizing the face key point information in the first image; and extracting the face part in the first image by utilizing the conversion matrix;
   wherein the replacing the face part in the first image with the super-sharp face image by utilizing the semantic segmentation image, comprises: placing the super-sharp face image at a first position by utilizing an inverse matrix of the conversion matrix, wherein the first position is a position of the face part in the first image; and taking the semantic segmentation image as a mask image, and fusing the super-sharp face image placed at the first position with the first image by utilizing the mask image, to replace the face part in the first image.

2. The method of claim 1, wherein detecting the face key point information in the original image comprises:
   inputting the original image into a pre-trained face key point detection model to obtain the face key point information in the original image.

3. The method of claim 1, wherein the face super-resolution model is a generative adversarial network (GAN) model.

4. The method of claim 1, wherein acquiring the semantic segmentation image corresponding to the super-sharp face image comprises:
   inputting the super-sharp face image into a pre-trained face segmentation model to obtain a segmented image; and
   determining the semantic segmentation image corresponding to the super-sharp face image by utilizing the segmented image.

5. The method of claim 2, wherein extracting the face part in the first image comprises:
   calculating a conversion matrix for realizing face alignment by utilizing the face key point information in the first image; and
   extracting the face part in the first image by utilizing the conversion matrix.

6. A face super-resolution realization apparatus, comprising:
   a processor and a memory for storing one or more computer programs executable by the processor, wherein when executing at least one of the computer programs, the processor is configured to:
extract a face part in a first image;
input the face part into a pre-trained face super-resolution model to obtain a super-sharp face image;
acquire a semantic segmentation image corresponding to the super-sharp face image; and
replace the face part in the first image with the super-sharp face image, by utilizing the semantic segmentation image, to obtain a face super-resolution image;
wherein when executing at least one of the computer programs, the processor is further configured to: detect face key point information in the original image; and enlarge the original image to obtain the first image, and obtain face key point information in the first image, wherein the face key point information in the first image comprises information obtained by performing image enlargement processing on the face key point information in the original image;
wherein when executing at least one of the computer programs, the processor is further configured to: calculate a conversion matrix for realizing face alignment by utilizing the face key point information in the first image; and extract the face part in the first image by utilizing the conversion matrix;
wherein when executing at least one of the computer programs, the processor is further configured to: place the super-sharp face image at a first position by utilizing an inverse matrix of the conversion matrix, wherein the first position is a position of the face part in the first image; and take the semantic segmentation image as a mask image, and fuse the super-sharp face image placed at the first position with the first image by utilizing the mask image, to replace the face part in the first image.

7. The apparatus of claim 6, wherein when executing at least one of the computer programs, the processor is further configured to: input the original image into a pre-trained face key point detection model to obtain the face key point information in the original image.

8. The apparatus of claim 6, wherein the face super-resolution model is a generative adversarial network (GAN) model.

9. The apparatus of claim 6, wherein when executing at least one of the computer programs, the processor is further configured to:
input the super-sharp face image into a pre-trained face segmentation model to obtain a segmented image; and
determine the semantic segmentation image corresponding to the super-sharp face image by utilizing the segmented image.

10. A non-transitory computer-readable storage medium storing computer instructions thereon, the computer instructions causing a computer to execute the method of claim 1.

11. A non-transitory computer-readable storage medium storing computer instructions thereon, the computer instructions causing a computer to execute the method of claim 2.

* * * * *